(12) United States Patent
Maeta

(10) Patent No.: US 10,009,544 B2
(45) Date of Patent: Jun. 26, 2018

(54) IMAGE CAPTURING APPARATUS, CONTROL METHOD OF THE SAME AND IMAGE SENSOR

(71) Applicant: CANON KABUSHIKI KAISHA, Tokyo (JP)

(72) Inventor: Shinichi Maeta, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 91 days.

(21) Appl. No.: 14/837,778

(22) Filed: Aug. 27, 2015

(65) Prior Publication Data
US 2016/0065873 A1 Mar. 3, 2016

(30) Foreign Application Priority Data

Sep. 2, 2014 (JP) ................................. 2014-178507
Jun. 24, 2015 (JP) ................................. 2015-126874

(51) Int. Cl.
*H04N 5/341* (2011.01)
*H04N 5/345* (2011.01)
(Continued)

(52) U.S. Cl.
CPC ......... *H04N 5/23293* (2013.01); *H04N 5/341* (2013.01); *H04N 5/3454* (2013.01); *H04N 5/361* (2013.01)

(58) Field of Classification Search
CPC .. H04N 5/23293; H04N 5/361; H04N 5/3454; H04N 5/341
See application file for complete search history.

(56) References Cited

U.S. PATENT DOCUMENTS

| 6,516,154 | B1* | 2/2003 | Parulski | H04N 5/225 348/333.01 |
| 2006/0221089 | A1* | 10/2006 | Kawamoto | G09G 5/363 345/531 |

(Continued)

FOREIGN PATENT DOCUMENTS

| CN | 101119490 A | 2/2008 |
| CN | 101715077 A | 5/2010 |

(Continued)

OTHER PUBLICATIONS

Dec. 4, 2017 Chinese Office Action, which is enclosed with an English Translation, that issued in the counterpart Chinese Patent Application No. 201510555819.9.

*Primary Examiner* — Mekonnen Dagnew
(74) *Attorney, Agent, or Firm* — Cowan, Liebowitz & Latman, P.C.

(57) ABSTRACT

An image capturing apparatus, comprises: an image capturing unit configured to generate image data of an object; an adding unit configured to add additional information, including first region information for specifying a first pixel region of the image data, and second region information for specifying a second pixel region included in the first pixel region, to the image data; a transmission unit configured to transmit the image data to which the additional information is added; and an image processing unit configured to extract from the image data, which is received via the transmission unit, the first pixel region and the second pixel region specified by the additional information obtained by receiving the image data, and to perform predetermined image processing on the extracted first pixel region and second pixel region.

12 Claims, 14 Drawing Sheets

(51) Int. Cl.
*H04N 5/232* (2006.01)
*H04N 5/361* (2011.01)

(56) References Cited

U.S. PATENT DOCUMENTS

| | | | | |
|---|---|---|---|---|
| 2006/0268330 | A1* | 11/2006 | Takanezawa | H04N 5/76 358/1.15 |
| 2008/0259184 | A1* | 10/2008 | Shingu | G06K 9/22 348/231.99 |
| 2010/0225790 | A1* | 9/2010 | Sasaki | G06T 5/50 348/241 |
| 2012/0327280 | A1 | 12/2012 | Ishii | |
| 2013/0215290 | A1* | 8/2013 | Solhusvik | H04N 5/2355 348/231.99 |

FOREIGN PATENT DOCUMENTS

| | | |
|---|---|---|
| CN | 102469277 A | 5/2012 |
| CN | 103139494 A | 6/2013 |
| CN | 103248820 A | 8/2013 |
| JP | 2012-120158 A | 6/2012 |

* cited by examiner

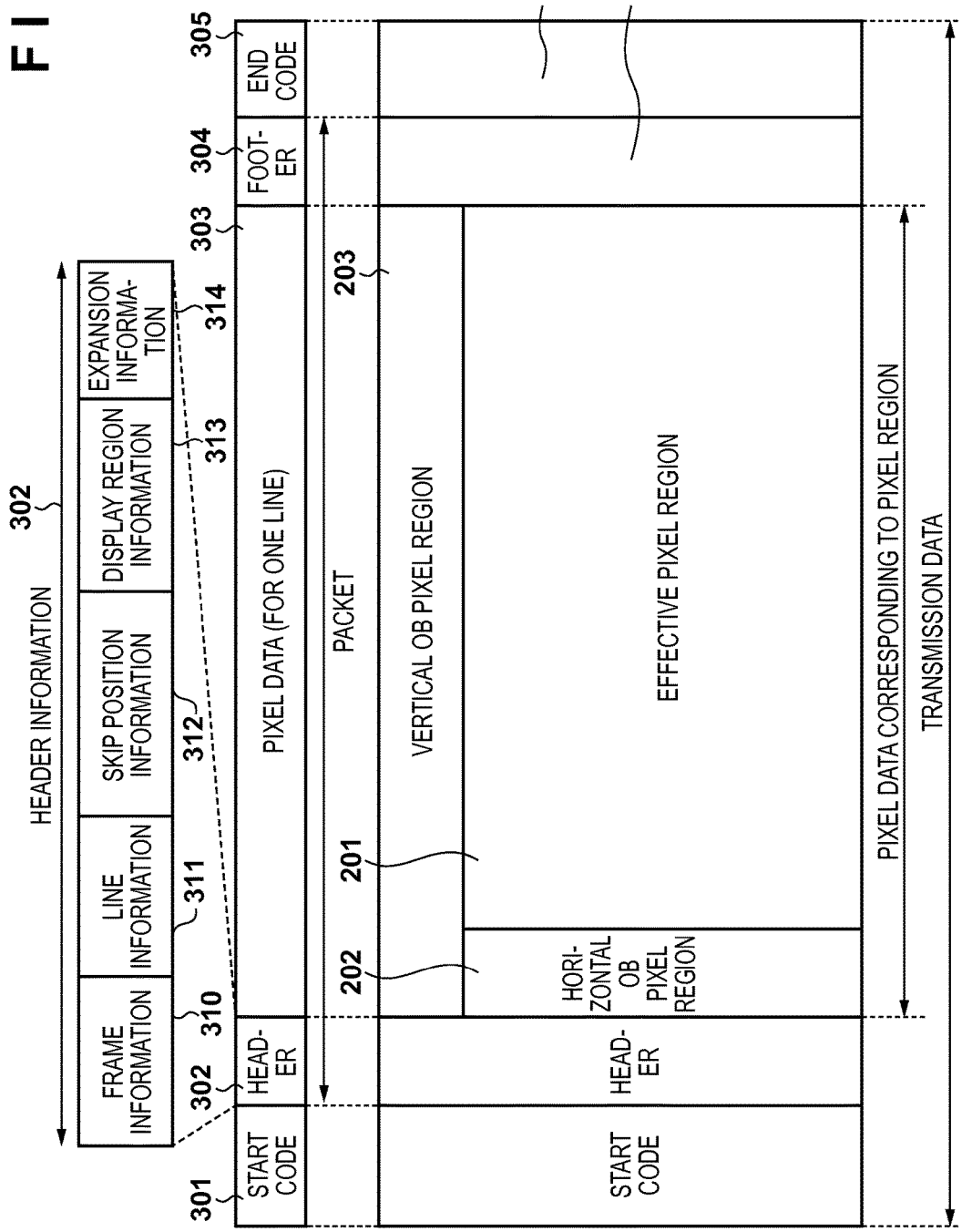

FIG. 4

| MAIN ITEM | SUB-ITEM | INFORMATION AMOUNT | CONTENT |
|---|---|---|---|
| FRAME INFORMATION | FRAME START | 1bit | INDICATES HEAD OF FRAME |
| | FRAME END | 1bit | INDICATES END OF FRAME |
| LINE INFORMATION | EFFECTIVE LINE | 1bit | INDICATES WHETHER LINE IS EFFECTIVE |
| | LINE NUMBER | 13bit | INDICATES LINE NUMBER |
| SKIP POSITION INFORMATION | VERTICAL SKIP START | 13bit | VERTICAL SKIP START POSITION |
| | VERTICAL SKIP END | 13bit | VERTICAL SKIP END POSITION |
| | HORIZONTAL SKIP START | 13bit | HORIZONTAL SKIP START POSITION |
| | HORIZONTAL SKIP END | 13bit | HORIZONTAL SKIP END POSITION |
| DISPLAY REGION INFORMATION | VERTICAL DISPLAY START | 13bit | VERTICAL DISPLAY START POSITION |
| | VERTICAL DISPLAY END | 13bit | VERTICAL DISPLAY END POSITION |
| | HORIZONTAL DISPLAY START | 13bit | HORIZONTAL DISPLAY START POSITION |
| | HORIZONTAL DISPLAY END | 13bit | HORIZONTAL DISPLAY END POSITION |
| EXPANSION INFORMATION | RESERVED | 32bit | ALLOCATED FOR FUTURE EXPANSION |

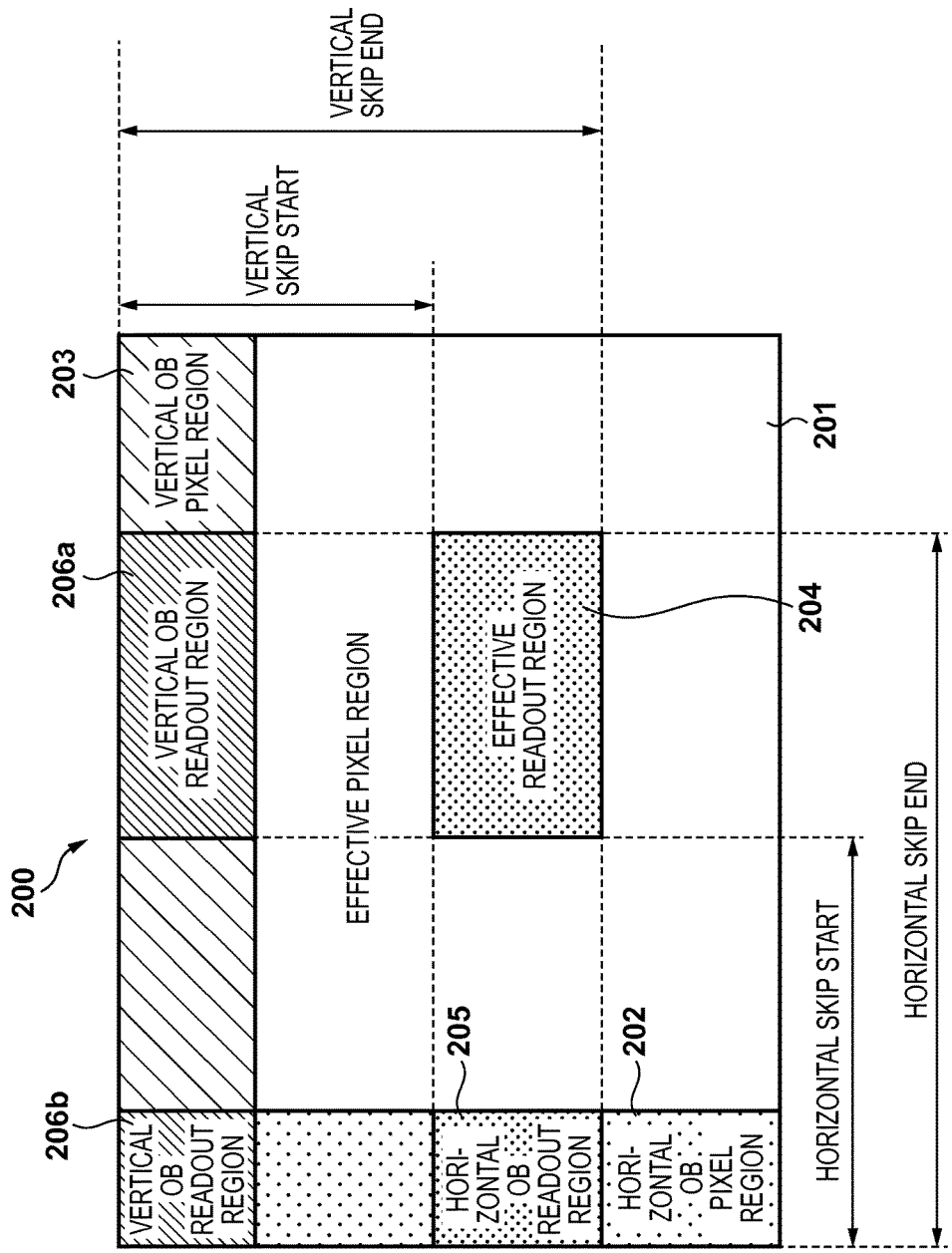

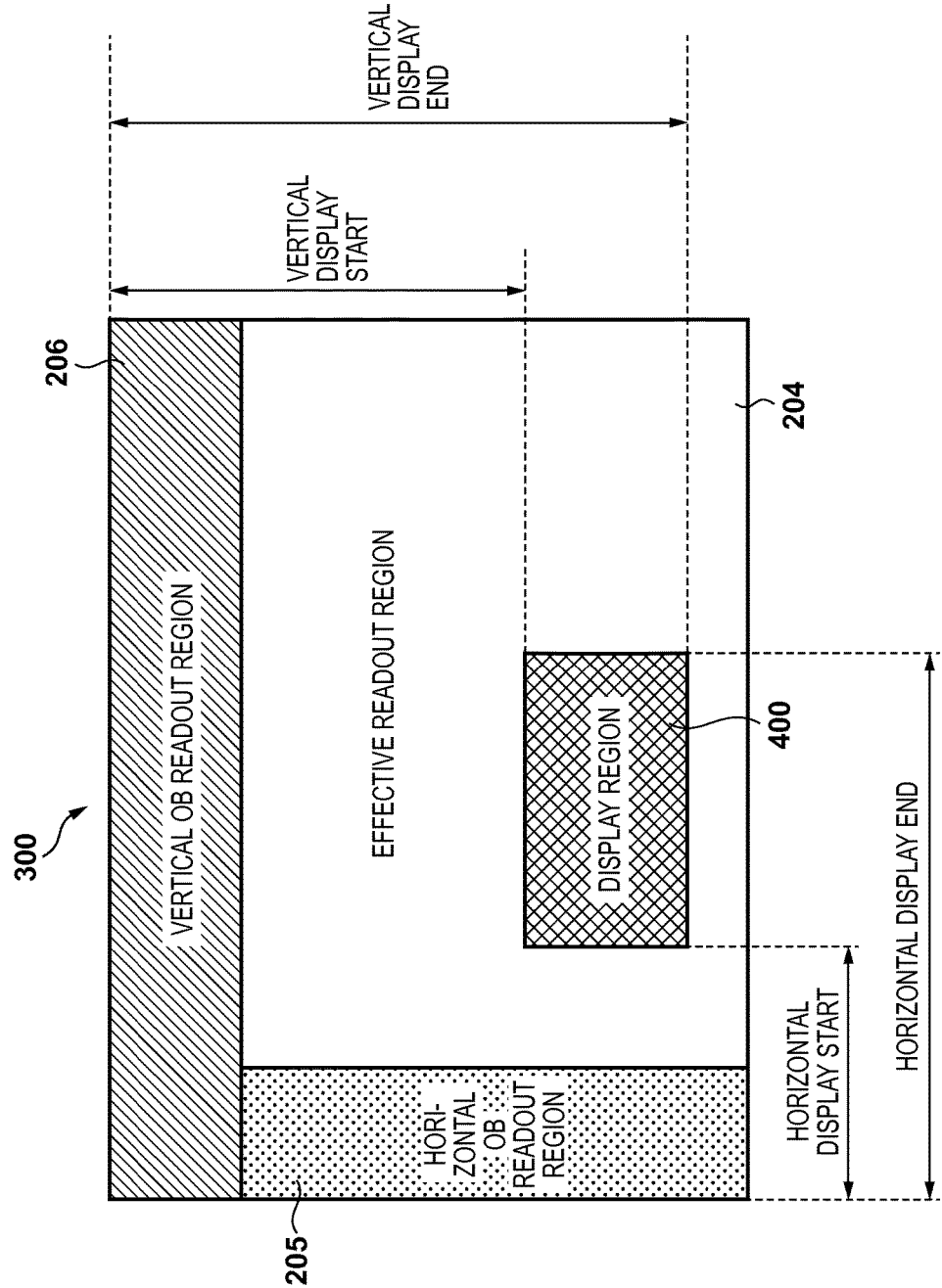

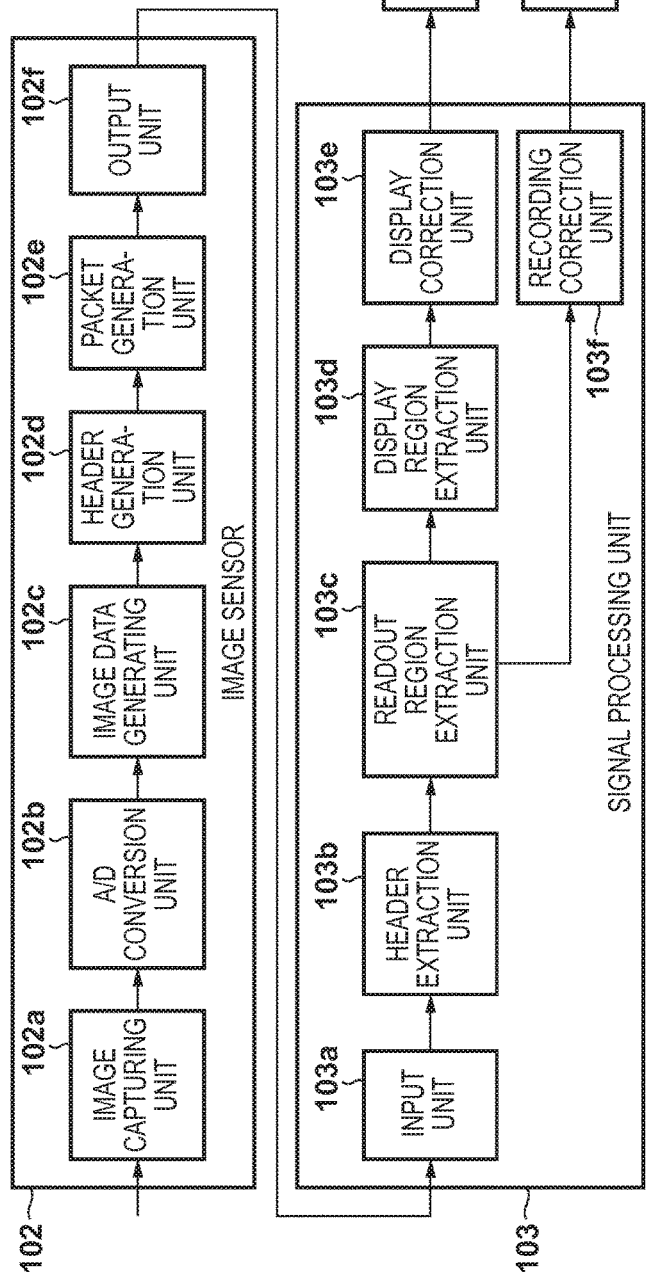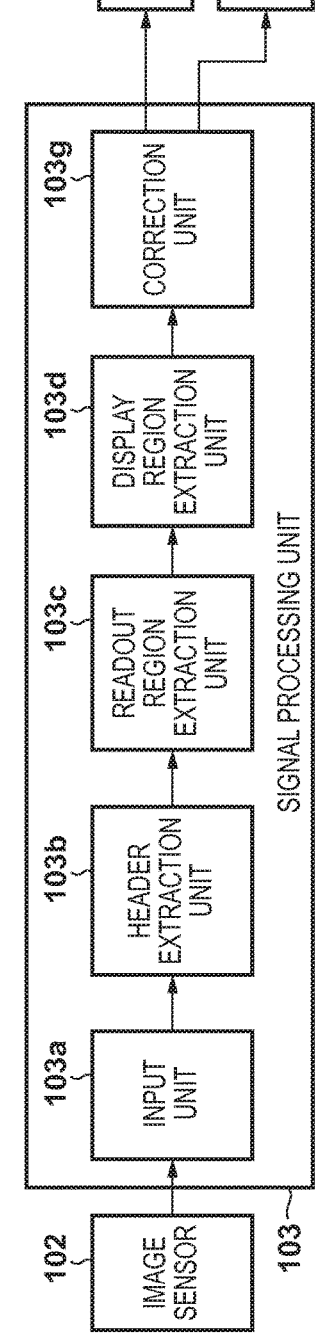

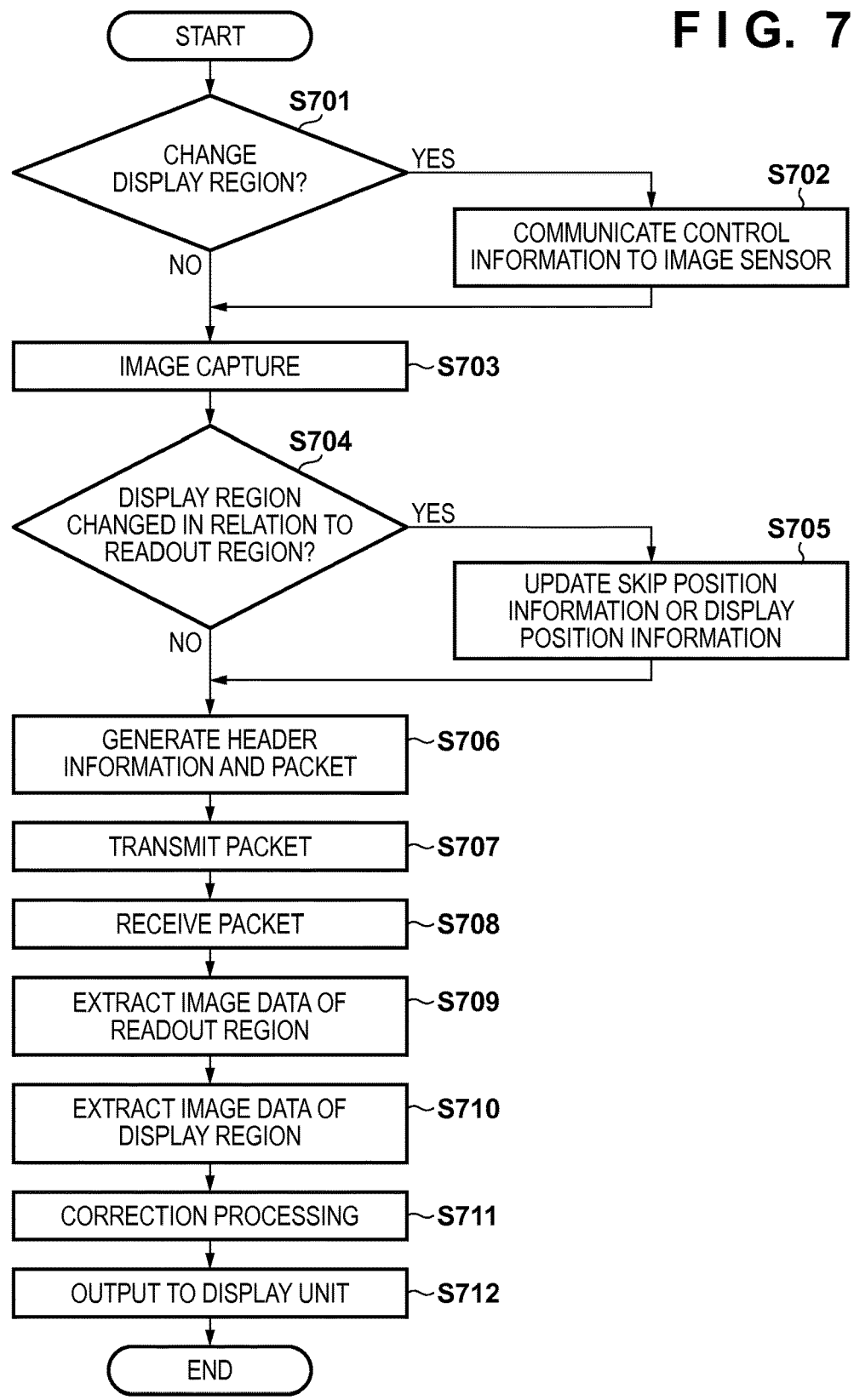

F I G. 10
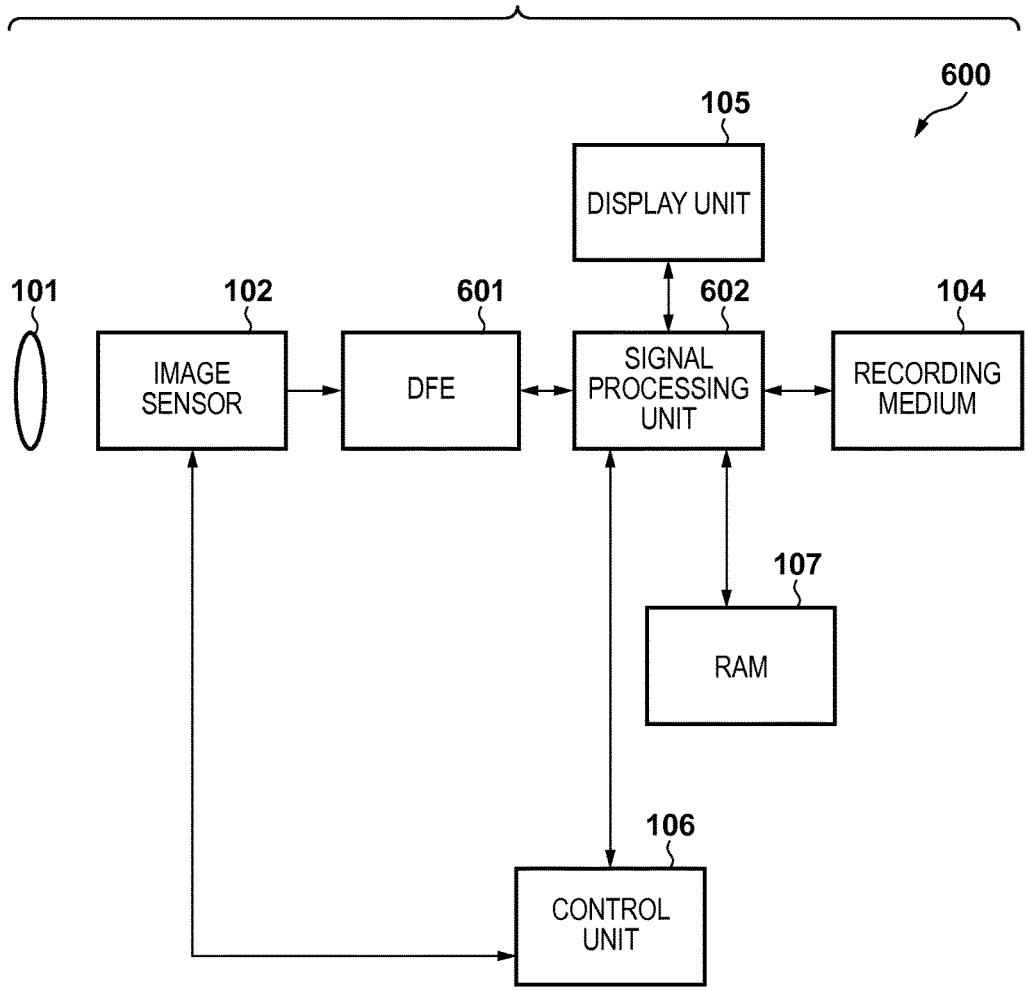

IMAGE CAPTURING APPARATUS, CONTROL METHOD OF THE SAME AND IMAGE SENSOR

BACKGROUND OF THE INVENTION

Field of the Invention

The present invention relates to an image capturing apparatus, a control method of the same, and an image sensor.

Description of the Related Art

There is demand for improvement in transmission speeds of an interface between an image sensor and a DSP that processes image data captured by an image sensor in conjunction with image quality enhancing and frame rate enhancing of the image sensor. With respect to this situation, a technique for transmitting image data more efficiently by transmitting image data to a plurality of transmission channels connected between the image sensor and the DSP by generating a packet in which header information is added to pixel data is disclosed in Japanese Patent Laid-Open No. 2012-120158.

Incidentally, there are cases in which a portion of image data that is captured in accordance with an operation of a user is displayed having been first magnified in a particular image capturing mode, such as one for a live view enlarged display during moving image capturing. In order to change a display region of an image which is captured in this way, it is necessary to perform magnified display processing, or the like, by retrieving a portion of a region (a readout region) used for recording, display, or the like, that changes dynamically from image data transmitted from the image sensor. For this reason, it is necessary that the DSP perform as needed a computation for obtaining a region for performing a magnified display with respect to an obtained readout region. Accordingly, it is envisioned that a processing burden of the DSP for the processing of the portion of the readout region in accompaniment of image quality enhancing, frame rate enhancing, and the like, will increase. Also, in the technique disclosed in Japanese Patent Laid-Open No. 2012-120158, header information transmitted from the image sensor to the DSP is limited to control information such as that for indicating a start or an end of a frame, or a line number that pixel data falls under. Accordingly, it does not consider processing for all of the readout region or a partial region of the readout region, and so separate control of the DSP by the control unit is necessary in order to perform the processing on the DSP, and it is envisioned that the processing will become more complicated.

SUMMARY OF THE INVENTION

The present invention has been made in consideration of the aforementioned problems, and realizes a technique by which it is possible to reduce a processing burden in relation to image data transmitted from an image sensor when processing is performed for a partial region of image data that is captured.

In order to solve the aforementioned problems, the present invention provides an image capturing apparatus, comprising: an image capturing unit configured to generate image data of an object; an adding unit configured to add additional information, including first region information for specifying a first pixel region of the image data, and second region information for specifying a second pixel region included in the first pixel region, to the image data; a transmission unit configured to transmit the image data to which the additional information is added; and an image processing unit configured to extract from the image data, which is received via the transmission unit, the first pixel region and the second pixel region specified by the additional information obtained by receiving the image data, and to perform predetermined image processing on the extracted first pixel region and second pixel region.

In order to solve the aforementioned problems, the present invention provides an image sensor, comprising: an image capturing unit configured to generate image data of an object; an adding unit configured to add additional information, including first region information for specifying a first pixel region of the image data, and second region information for specifying a second pixel region included in the first pixel region, to the image data; and a transmission unit configured to transmit the image data to which the additional information is added.

In order to solve the aforementioned problems, the present invention provides a control method of an image capturing apparatus having an image capturing step of generating image data of an object; an adding step of adding additional information, including first region information for specifying a first pixel region of the image data, and second region information for specifying a second pixel region included in the first pixel region, to the image data; a transmission step of transmitting the image data to which the additional information is added; and an image processing step of extracting from the image data, which is received via the transmission unit, the first pixel region and the second pixel region specified by the additional information obtained by receiving the image data, and performing predetermined image processing on the extracted first pixel region and second pixel region.

According to the present invention, it become possible to reduce a processing burden in relation to image data transmitted from an image sensor when processing is performed for a partial region of image data that was captured.

Further features of the present invention will become apparent from the following description of exemplary embodiments (with reference to the attached drawings).

BRIEF DESCRIPTION OF THE DRAWINGS

FIG. 3 is a view for illustrating an example of a transmission data frame format according to embodiments.

FIG. 4 is a table for illustrating content and an information amount of header information according to embodiments.

FIG. 5A-FIG. 5B are views for illustrating a relationship between an image region and a readout region, and a view for illustrating a relationship between the readout region and the display region according to embodiments.

FIG. 6A-FIG. 6B are block diagrams for illustrating a functional configuration example of the image sensor 102 and a signal processing unit 103 according to a first embodiment, and a block diagram for showing a functional configuration example of the signal processing unit 103 according to a second embodiment.

FIG. 7 is a flowchart for illustrating a series of operations of transmission and display processing according to embodiments.

FIG. 10 is a block diagram for showing a functional configuration of an image capturing apparatus 600 according to a fourth embodiment.

The accompanying drawings, which are incorporated in and constitute a part of the specification, illustrate embodiments of the invention, and together with the description, serve to explain the principles of the invention.

DESCRIPTION OF THE EMBODIMENTS

First Embodiment

Exemplary embodiments of the present invention will be described hereinafter in detail, with reference to the accompanying drawings. Note that explanation is given below of examples in which the present invention is applied to a digital camera capable of processing a partial region of a captured image, as an example of an image capturing apparatus. However, the present invention can be applied to any device capable of performing this processing and is not limited to the digital camera. These devices may include mobile telephones, game devices, tablet terminals, personal computers, clock-type or glasses-type information terminals, or the like, for example.

(1 Configuration of Digital Camera 100)

Figure 1:
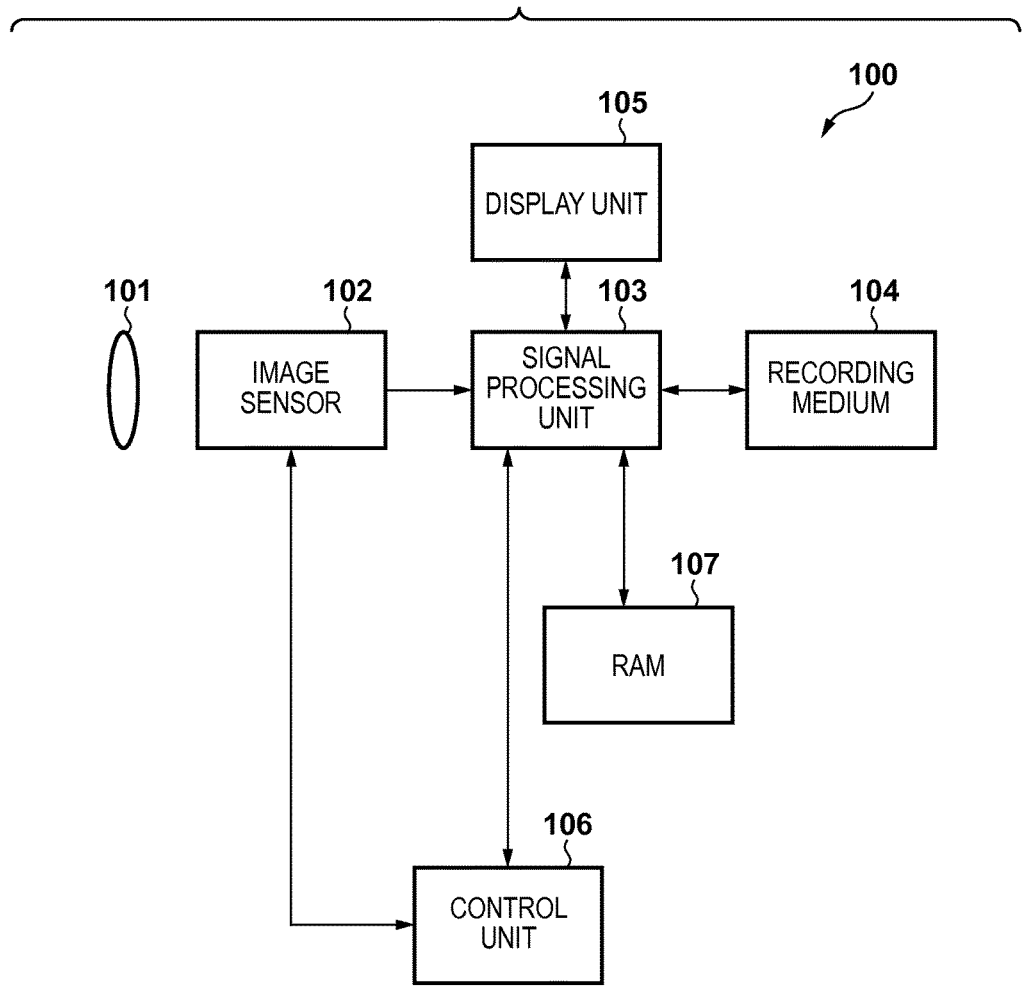
FIG. 1 is a block diagram for showing a functional configuration example of a digital camera 100 which is an example of an image capturing apparatus according to embodiments of the present invention.

FIG. 1 is a block diagram for showing a functional configuration example of a digital camera 100 which is an example of the image capturing apparatus of the present embodiment. Note that, one or more of the functional blocks shown in FIG. 1 may be realized by hardware such as an ASIC, a programmable logic array (PLA), or the like, and may be realized by a programmable processor such as a CPU, an MPU, or the like, executing software. Also, these may be realized by a combination of software and hardware. Accordingly, in the following explanation, even in a case where different functional blocks are recited as the subject of operations, it is possible that this may be realized by the same hardware as the subject.

An imaging lens 101 is an optical imaging system for forming light of an object into an image on an image sensor 102. The image sensor 102 includes an image sensor and has a configuration in which a plurality of pixels having a photoelectric conversion element are arranged two-dimensionally, and an image of the subject formed by the imaging lens 101 is photoelectrically converted by the pixels. There is no particular limitation to the image sensor 102; an image sensor such as a CCD (Charge-Coupled Device) image sensor, a CMOS (Complementary Metal Oxide Semiconductor) image sensor, or the like, may be used, for example. The image sensor 102 has an A/D conversion unit internally, and generates image data by converting an analog signal in units of pixels into a digital signal. Also, as will be explained later, the image sensor 102 makes packet data adding additional information such as header information to image data, and then transmits that to a signal processing unit 103.

The signal processing unit 103 comprises an application-specific circuit such as a DSP, and performs various image processing, such as development processing, tone correction, or the like, compression/decompression processing, or the like, on image data input from the image sensor 102. When image data is input from the image sensor 102, the signal processing unit 103 performs processing for extracting a predetermined region within the image data for a magnified display, for example, by referring to additional information added to image data as will be explained later separately.

A recording medium 104 is comprised of a semiconductor memory, a magnetic disk, or the like, for recording captured image data.

A display unit 105 displays an image which is captured, various menu screens, or the like; for the display unit 105, a liquid crystal display (LCD) is used. The display unit 105 comprises a touch panel, and functions as an operation unit (not shown) for detecting operations of the user on a menu screen.

A control unit 106 is, for example, a CPU or an MPU, and the control unit 106 controls the digital camera 100 on the whole by loading a program stored in a ROM (not shown) into a work area of a memory (not shown), and executing the program. A RAM 107 is a storage medium for temporarily storing image data, and the RAM 107 is connected to the signal processing unit 103.

(2 Method of Transmission Image Data)

Figure 2:
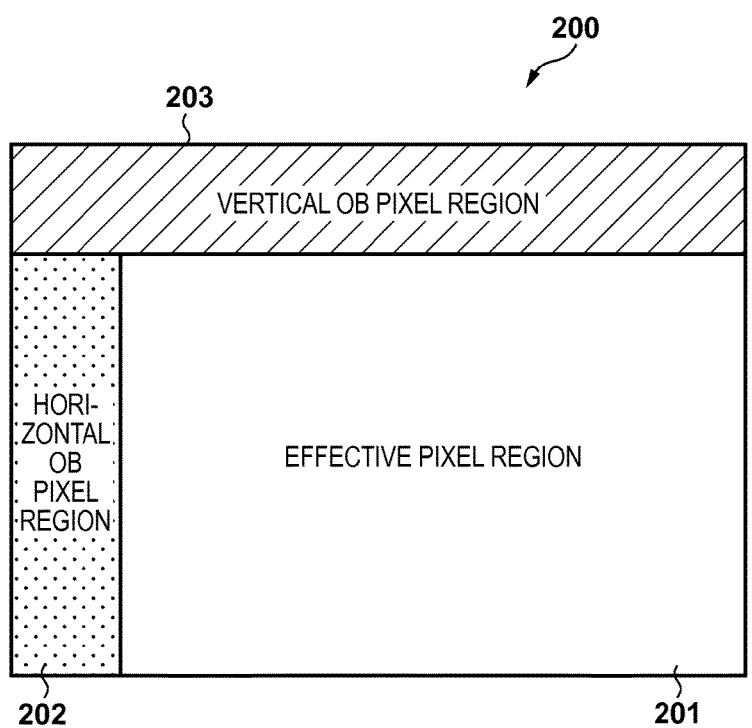
FIG. 2 is a view for illustrating schematically pixel regions of an image sensor 102 according to embodiments.

An example of pixel regions of the image sensor 102 is described hereinafter in detail, with reference to FIG. 2. In an effective pixel region 201, effective pixels that photoelectrically convert light of an object and output a signal in accordance with a quantity of incident light are arranged. On the image sensor 102, optical black pixels (OB pixels) from which light of an object is light-shielded are arranged in addition to the effective pixels, and these OB pixels output a signal which becomes a basis for correcting an output of effective pixels. A horizontal OB pixel region 202 and a vertical OB pixel region 203 are regions in which OB pixels are arranged respectively. The horizontal OB pixel region 202 is a region in which the number of pixels in a vertical direction (a direction along a column) is equal to the number of pixels of a vertical direction of the effective pixel region 201, and for example, the horizontal OB pixel region 202 is arranged to be neighboring an end portion (for example, a left side) of a horizontal direction of the effective pixel region 201 (a direction along a row). For the vertical OB pixel region 203, the number of pixels of the horizontal direction is equal to the sum of the number of pixels in a horizontal direction of the horizontal OB pixel region 202 and the effective pixel region 201, and the vertical OB pixel region 203 is arranged to contact an end portion in a vertical direction of the effective pixel region 201 (for example, a top side). A pixel region 200 is comprised of the effective pixel region 201, the horizontal OB pixel region 202, and the vertical OB pixel region 203.

Next, explanation is given with reference to FIG. 3 for an example of a format used in order to transmit image data of one frame between the image sensor 102 and the signal processing unit 103.

When an order of pixels in a horizontal direction (a direction along a row) is assumed to be a line, pixel data comprising one line including effective pixels, and OB pixels is stored in a packet. Accordingly, the transmission of the entirety of the image data of one frame is performed using packets of a number not less than the number of pixels in the vertical direction of the effective pixel region (a direction along a column).

In an upper part and a middle part of FIG. 3 are shown header information added when transmitting pixel data by the line, and a packet structure for a case in which the header information, and data including pixel data for one line are put into a single packet. Also, correspondence between pixel data output from pixel regions as shown in FIG. 2 and the packet structure is illustrated schematically as shown in the lower part of FIG. 3.

Before and after pixel data 303, header information 302 and footer information 304 are added. Additionally, control codes such as a start code 301 indicating the start of a packet, and an end code 305 representing the end of the packet are added before the header information 302 and after the footer information 304 respectively. When the footer information 304 is not added, a control code such as the end code 305 is added after pixel data, and when the end code 305 is not added, a start code of the next frame is used as the end code.

Additional information related to pixel data of the lines such as frame information 310, line information 311, skip position information 312, display region information 313, or the like, is included in the header information 302. In FIG. 4, content of information, and an information amount included in the header information 302 is shown.

The frame information 310 is information relating to a frame of pixel data stored in the packet, and the frame information 310 is comprised of information indicating "a frame start" or "a frame end". The "frame start" is one bit of information representing a head of a frame, and the value 1 is set in the "frame start" of the packet which includes pixel data of the first line of image data. Also, the value 0 is set for the "frame start" of a packet including a line other than the first line. The "frame end" is one bit of information representing a termination of a frame. The value 1 is set in the "frame end" of a packet including pixel data of the terminating line of the effective pixel region, and the value 0 is set in the "frame end" of a packet including pixel data of a line other than the terminating line.

The line information 311 is comprised of an "effective line" and a "line number", which are information relating to the line of the pixel data stored in the packet. The "effective line" is one bit of information representing whether or not the pixel data stored in the packet is pixel data of a line of the effective pixel region. In the "effective line" of a packet in which pixel data of a line of an effective pixel region is stored, the value 1 is set, and in the "effective line" of a packet in which pixel data other than a line of an effective pixel region is stored, the value 0 is set. The "line number" is 13 bits of information representing a line number of a line comprised of pixel data.

Skip position information 312 is information relating to a skip position for reading out pixel data from image data transmitted to the signal processing unit 103, and the skip position information 312 comprises a "vertical skip start", a "vertical skip end", a "horizontal skip start", and a "horizontal skip end". Each information item is 13 bits of information, and the "vertical skip start" represents a start position in a vertical direction of the skip position (a direction along a column), and the "vertical skip end" represents an end position of a vertical direction of the skip position (a direction along a column). Similarly, the "horizontal skip start" represents a start position of a horizontal direction of the skip position (a direction along a row), and the "horizontal skip end" represents an end position in a horizontal direction of the skip position (a direction along a row).

The display region information 313 is information indicating pixel data included in a display region, and the display region information 313 comprises a "vertical display start", a "vertical display end", a "horizontal display start", and a "horizontal display end". The information items of the display region information are each 13 bits of information, and the "vertical display start" represents a start position in a vertical direction of the display region (a direction along a column), and the "vertical display end" represents an end position in a vertical direction of the display region (a direction along a column). Also, a "horizontal display start" represents a start position in a horizontal direction (a direction along a row) of the display region, and a "horizontal display end" represents an end position in a horizontal direction (a direction along a row) of the display region.

Expansion information 314 comprises a "reserved" comprising a 32 bit region arranged for an expansion, and the data amount of the entirety of the header information is 19 bytes.

A method for specifying a display region and a readout region based on header information shown in FIG. 3 and FIG. 4 from pixel data corresponding to a pixel region shown in FIG. 2 will be explained with reference to FIG. 5. FIG. 5A shows readout regions specified by the skip position information 312 of the header information 302, and the image sensor pixel region 200.

A readout region 300 is a region extracted by the signal processing unit 103 in order to record on the recording medium 104. An effective readout region 204 in the readout region 300 is specified as a region surrounded by 4 positions indicated by the skip position information of the header information 302, i.e. a "vertical skip start", a "vertical skip end", a "horizontal skip start", and a "horizontal skip end" respectively. Also, a vertical OB readout region 206, which corresponds to the effective readout region 204, comprises a vertical OB readout region 206a and a vertical OB readout region 206b. The vertical OB readout region 206a is specified by a range in a horizontal direction that positions of "horizontal skip start" and "horizontal skip end" in the vertical OB pixel region indicate respectively. Also, the vertical OB readout region 206b is specified as a region arranged at a top side of a horizontal OB pixel region, and for which the number of pixels in a horizontal direction is equal to the number of pixels in a horizontal direction of the horizontal OB pixel region. A horizontal OB readout region 205 is specified by a vertical direction range that positions of a "vertical skip start" and a "vertical skip end" in the horizontal OB pixel region 202 indicate respectively. In this way, the readout region 300 is extracted by the effective readout region 204, the horizontal OB readout region 205, and the vertical OB readout region 206 being specified respectively.

Next, a relationship between the readout region 300 and a display region 400 will be explained with reference to FIG. 5B. The display region 400 is a region used when performing a magnified display by retrieving a part of the readout region 300 in a particular image capturing mode such as a live view enlarged display during moving image capturing, for example. The display region 400 is specified by the readout region 300 and the display region information 313 of the header information 302. The display region 400 is determined as a region surrounded by four positions that a "vertical display start", a "vertical display end", a "horizontal display start", and a "horizontal display end" of the display region information 313 respectively indicate.

(3 Functional Configuration of the Image Sensor 102 and Transmission of Image Data)

An example of a functional configuration of the image sensor 102, and packet generation processing for transmitting image data by the above described transmission method will be explained with reference to FIG. 6A.

An image capturing unit 102*a* outputs an analog signal in units of pixels by photoelectrically converting an image of the subject incident on the pixel region 200. An A/D conversion unit 102*b* converts an obtained analog signal into digital signal, and outputs a result, and an image data generating unit 102*c* generates the obtained digital signal as image data corresponding to the pixel region 200.

The header generation unit 102*d* generates information such as the skip position information shown in FIG. 4 which is added to one line of pixel data as header information based on control information communicated from the control unit 106. The control information communicated from the control unit 106 may be control information related to a readout region, for example, or control information related to a display region. There may be control information of a readout region for an electronic image stabilization function, for example, in the control information related to the readout region. Also, there may be the control information related to a display magnification in a live view enlarged display, for example, in the control information related to the display region. A header generation unit 102*d* determines skip position information which specifies the readout region 300 based on control information related to a readout region for an electronic image stabilization function, for example. Also, based on control information indicating a display magnification in a live view enlarged display, display region information specifying the display region 400 is determined.

A packet generation unit 102*e* generates a packet in which header information generated by the header generation unit 102*d* is added to one line of pixel data. An output unit 102*f* outputs a packet generated by the packet generation unit 102*e* to the signal processing unit 103.

(4 Functional Configuration of the Signal Processing Unit 103 and Packet Processing)

Next, an example of a functional configuration of the signal processing unit 103 and packet processing for receiving image data by the above described transmission method and applying signal processing will be explained with reference to FIG. 6A.

The input unit 103*a* receives a packet including pixel data for one line transmitted by the above described transmission method. The header extraction unit 103*b* extracts and analyzes header information from a packet received by the input unit 103*a*, and outputs pixel data and header information necessary for later processing.

The readout region extraction unit 103*c* extracts pixel data of a readout region based on the skip position information of the header information. Also, the readout region extraction unit 103*c* generates image data corresponding to the readout region from the extracted pixel data, and outputs it to the display region extraction unit 103*d* and the recording correction unit 103*f*.

The display region extraction unit 103*d* extracts the display region 400 based on the display region information of the header information 302 from the readout region extracted in the readout region extraction unit 103*c*. In this way, it becomes unnecessary to perform a computation to obtain the display region 400 in the signal processing unit 103 by transmitting image data to which information specifying the display region and the readout region is added from the image sensor 102. Also, the need to communicate control information for controlling the readout region 300 and the display region 400 to the signal processing unit 103 disappears in the control unit 106. Accordingly, in the signal processing unit 103, control in relation to the display region 400 by the control unit 106, for example, becomes unnecessary, and control is simplified.

The display correction unit 103*e* outputs post-correction image data after performing correction processing corresponding to display characteristics of the display unit 105, for example, on pixel data of a display region extracted in the display region extraction unit 103*d*.

In the recording correction unit 103*f*, post-correction image data is output after performing correction processing suitable for recording, for example, on readout region data extracted in the readout region extraction unit 103*c*.

By adding information specifying the display region and the readout region in the header information in this way, the signal processing unit 103 is able to extract an image for display and an image for recording easily, and is further able to easily apply individual correction processing for recording and display.

(Transmission of Image Data and Series of Operations for Display Processing)

Next, with reference to FIG. 7, explanation is given for a series of operations for image data transmission and display processing. Note that this processing is started when, in a state in which the digital camera 100 is performing a live view display, a user operation on the operation unit (not shown), for example, is detected.

In step S701, the control unit 106 determines whether the user operation is an instruction for changing the display region that is displayed on the display unit 105. The control unit 106 determines whether a user operation is an operation for changing the display region based on the operation information communicated from the operation unit; when the user operation is for changing the display region, the processing proceeds to step S702, and when the user operation is not for changing the display region, the processing advances to step S703.

In step S702, the control unit 106 communicates control information for changing the display region to the image sensor 102. The control information for changing the display region is control information related to a display magnification in a live view enlarged display, for example, and an update to a display magnification corresponding to an instruction of the user operation, for example, is performed. Then the control unit 106 communicates the control information to the image sensor 102. Note that the control unit 106 separately determines a change of the readout region 300 for an electronic image stabilization function, or the like, and separately communicates a notification for the change to the image sensor 102.

In step S703, the image sensor 102 performs image capturing processing based on an instruction of the control unit 106. The image sensor 102 generates image data by exposing light from an object for an appropriate time interval.

In step S704, the image sensor 102 determines whether the display region 400 is changed in relation to the readout region 300. More specifically, the header generation unit 102*d* of the image sensor 102 specifies the display region 400 based on control information for changing the display region obtained from the control unit 106. The header generation unit 102*d* determines the readout region 300 based on the control information of the readout region communicated separately from the control unit 106, and thus is able to specify the display region 400 in accordance with the readout region 300. When either the readout region 300 or the display region 400 changes, the header generation unit 102d determines that the display region 400 in relation to the readout region 300 changes, and advances the processing to step S705. On the other hand, when it is determined that the region does not change, the processing advances to step S706.

In step S705, the image sensor 102 updates skip position information or display region information stored in the header information 302.

In step S706, the image sensor 102 generates the header information 302 and a packet including that header information. The header generation unit 102d generates the header information 302, which stores skip position information or display region information. Also, the header generation unit 102d generates the header information 302 which stores display region information which is the same as the readout region 300 when the display region 400 and the readout region 300 are the same due to the live view enlarged display not being performed. After this, the packet generation unit 102e generates a packet including the header information.

In step S707, the image sensor 102 transmits the generated packet to the signal processing unit 103. The image sensor 102 repeats transmission of one line packets, for example, at a predetermined timing until one frame of an image is transmitted.

In step S708, the signal processing unit 103 receives packets that the image sensor 102 transmits sequentially, and in step S709 the signal processing unit 103 extracts pixel data of the readout region 300 from the received packets. More specifically, the readout region extraction unit 103c of the signal processing unit 103 extracts pixel data of the readout region 300 based on the skip position information of the header information.

In step S710, the display region extraction unit 103d of the signal processing unit 103 extracts pixel data of the display region 400 specified by the header information from the readout region 300.

In step S711, the display correction unit 103e of the signal processing unit 103 performs correction processing by generating a display image from the pixel data of the extracted display region. More specifically, correction processing is performed on the display image and interpolation processing for adapting to the number of pixels of the display image is performed based on the extracted pixel data.

In step S712, the display correction unit 103e of the signal processing unit 103 outputs a display image to the display unit 105 when the correction processing for the display completes. Then, the control unit 106 ends the processing sequence when the signal processing unit 103 outputs the display image.

Note that, in the above described processing sequence, processing for displaying transmitted image data is explained, but this can be adapted to processing for recording transmitted image data. In other words, it is possible to configure so as to output to the recording medium 104 after the recording correction unit 103f performs correction processing for recording on the pixel data of the extracted readout region in step S707.

As explained above, in the present embodiment, configuration is taken such that the image sensor 102 stores and transmits information indicating a display region and a readout region in header information of pixel data when the display region 400 of image data that is captured is changed.

Then, the signal processing unit 103 extracts a display region and a readout region based on header information of the pixel data that is received. With such a configuration, it become possible to reduce a processing burden in relation to image data transmitted from an image sensor when processing is performed for a partial region of image data that was captured. In other words, computation to obtain the display region 400 in the signal processing unit 103 is unnecessary. Also, the control unit 106 communicates control information for changing the display region to the image sensor 102. With such a configuration, it becomes possible to simplify control of the display region because control of the signal processing unit 103 by the control unit 106 becomes unnecessary. Furthermore, separate correction processing is applied to the readout region 300 and the display region 400 extracted with reference to the header information. As a result, different correction processing can be adapted easily simply by referring to the header information. In other words, it is possible to switch a correction parameter in accordance with a region indicated by the header information.

Second Embodiment

Next, explanation will be given for a second embodiment. For the digital camera 100 according to a second embodiment, the internal configuration of the signal processing unit 103 differs from that of the first embodiment. In other words, while the correction unit of the first embodiment comprises correction units corresponding to each of the recording medium 104 and the display unit 105 shown in FIG. 6A, only the correction unit 103g as shown in FIG. 6B is comprised in the second embodiment. Because configuration other than that of the correction unit is the same for the digital camera according to a second embodiment, the same reference numerals are given for the same configuration elements, and duplicate explanation is omitted, and predominantly explanation is given for differences.

FIG. 6B is a block diagram for showing a functional configuration of a signal processing unit 103 according to the second embodiment. When it is not necessary to switch image processing on the image data for display and image data for recording, the same image processing is performed by the correction unit 103g. In such a case configuration may be taken in which, even when the display region and the readout region differ, image processing is performed time-divisionally by a single correction unit. With such a configuration, similarly to the previously described first embodiment, it is possible to reduce a processing burden for processing image data transmitted from an image sensor when processing is performed on a region of a portion of image data that is captured. Furthermore, it is possible to reduce a circuit scale by commonalizing the correction units.

Third Embodiment

Next, explanation will be given for a third embodiment. For a digital camera 500 according to a third embodiment, a basic configuration is the same as in the first embodiment, but configuration differs from the first embodiment on the point that an AFE (Analog Front End) 501 is comprised.

Figure 8:
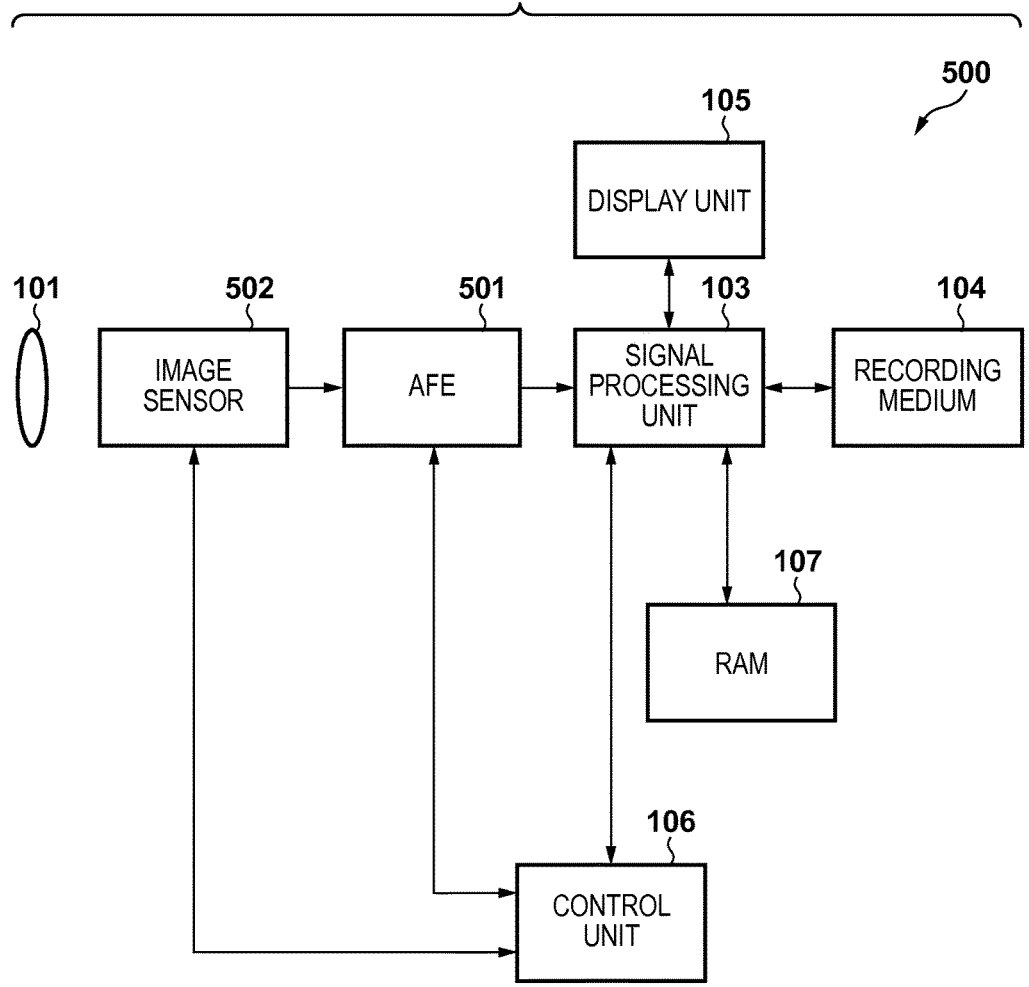
FIG. 8 is a block diagram for showing a functional configuration of an image capturing apparatus 500 according to a third embodiment.
Figure 9:
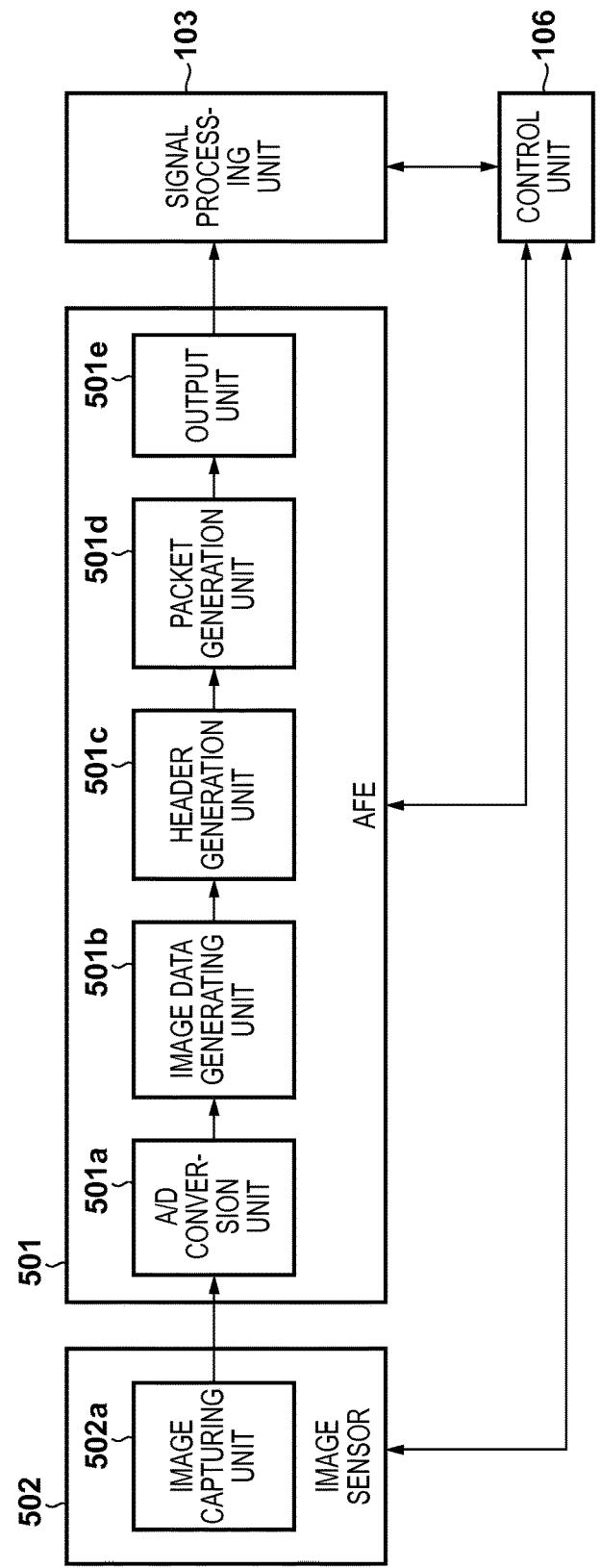
FIG. 9 is a block diagram for showing a functional configuration example of an AFE 501 according to the third embodiment.

FIG. 8 is a view for illustrating an overall configuration of the digital camera 500, and FIG. 9 is a block diagram for illustrating a functional configuration example of the AFE 501 and an image sensor 502 in FIG. 8. The image sensor 502 simply has an image capturing unit 502a, and this functional block corresponds to the image capturing unit 102a of the image sensor 102 in the first embodiment. The image sensor 502 outputs an analog signal in units of pixels that is photoelectrically converted.

The AFE 501 comprises an A/D conversion unit 501a, an image data generating unit 501b, a header generation unit 501c, a packet generation unit 501d, and an output unit 501e. The configurations of reference numerals 501a-501e respectively correspond to the configurations of reference numerals 102b-102f explained in the first embodiment. The AFE 501 is controlled by the control unit 106, and converts an analog signal in units of pixels received from the image sensor 502 into a digital signal. The AFE 501 performs the same processing as is performed by the elements of reference numerals 102b-102f in the first embodiment, and transmits image data to the signal processing unit 103. By virtue of the present embodiment, similarly to the previously described first embodiment, it is possible to reduce a processing burden for processing image data transmitted from an image sensor when processing is performed on a partial region of image data that is captured. Furthermore, it is possible to use an image sensor that outputs an analog signal by performing A/D conversion processing and header generation processing aside from the image sensor. Also, it becomes possible to apply transmission processing and display control of the present invention to a simple image sensor by providing a functional block for processing for transmitting image data to a unit external to the image sensor.

Fourth Embodiment

Next, explanation will be given for a fourth embodiment. A digital camera 600 according to a fourth embodiment has a basic configuration that is similar to the first embodiment, but differs on the point that a DFE (Digital Front End) 601 is comprised.

Figure 11:
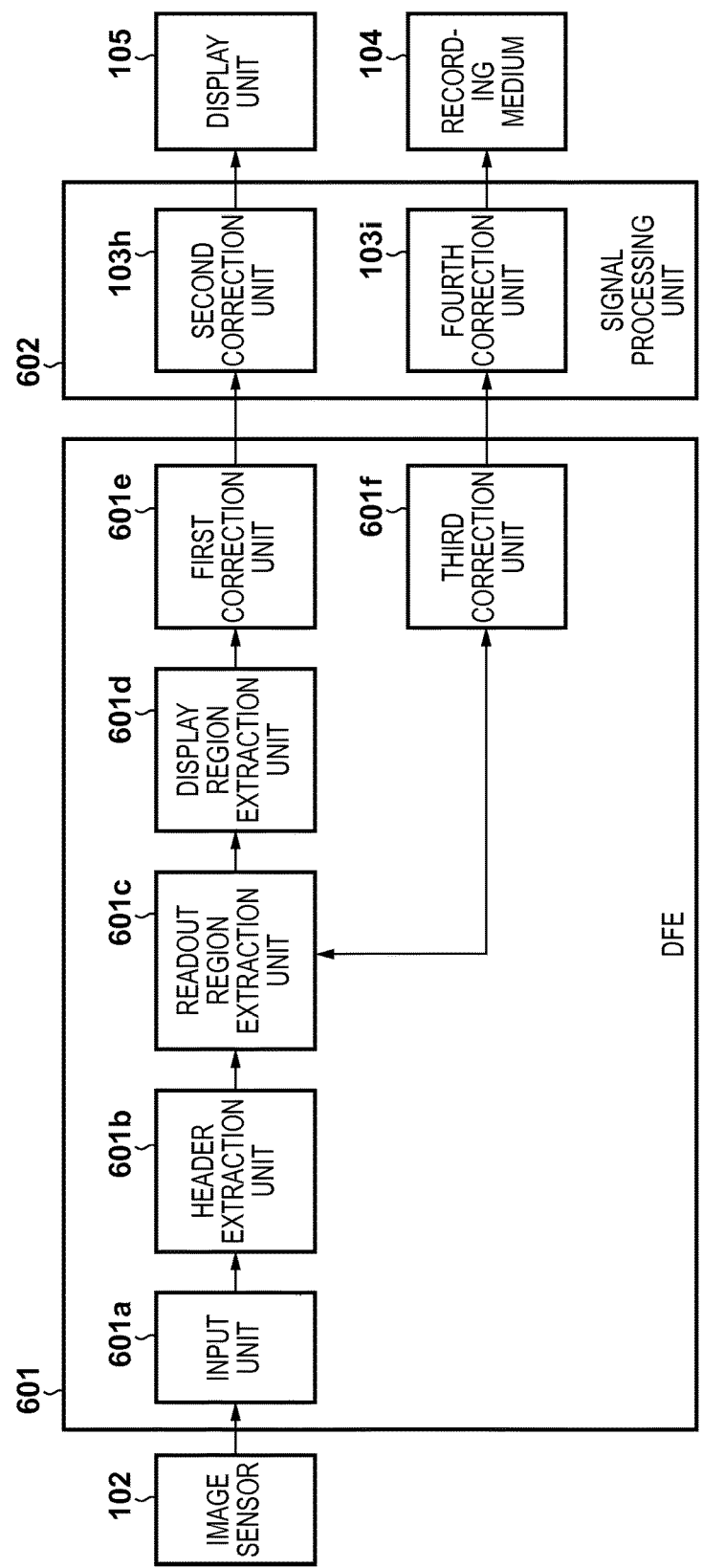
FIG. 11 is a block diagram for illustrating a functional configuration example of a DFE 601 and the signal processing unit 602 according to the fourth embodiment.

FIG. 10 illustrates a functional configuration example of the digital camera 600. Correction processing is performed by the signal processing unit 602 after a packet transmitted from the image sensor 102 is processed using a DFE 601. A functional configuration example of the DFE 601 is shown in FIG. 11. The DFE 601 comprises an input unit 601a, a header extraction unit 601b, a readout region extraction unit 601c, and a display region extraction unit 601d corresponding to the element of reference numerals 103a-103d of the signal processing unit 103 explained in the first embodiment. For display region data extracted by the display region extraction unit 601d, firstly, correction processing such as tone correction is performed in accordance with display characteristics by the first correction unit 601e. After this, a result is output from the DFE 601, and image processing accompanying enlargement processing in accordance with the number of pixels to be displayed, for example, is performed by the second correction unit 103h of the signal processing unit 602. Also, for the readout region data extracted by the readout region extraction unit 601c, firstly image processing such as tone correction is performed in accordance with recording characteristics by the third correction unit 601f. After this, a result is output from the DFE 601, and predetermined image processing in accordance with a requirement of the recording medium 104, for example, is performed by the fourth correction unit 103i of the signal processing unit 602. Note that configuration may be taken in which a portion of processing performed by the DFE 601 is performed by a DSP.

By virtue of the present embodiment, similarly to the first embodiment, it is possible to reduce a processing burden for processing image data transmitted from an image sensor when processing is performed on a partial region of image data that is captured. Furthermore, by configuring to combine a plurality of image processes, it becomes possible to switch the plurality of the image processes on image data in accordance with correction details, data paths, or the like, and thereby it is possible to improve efficiency of image processing.

Other Embodiments

Figure 12A:
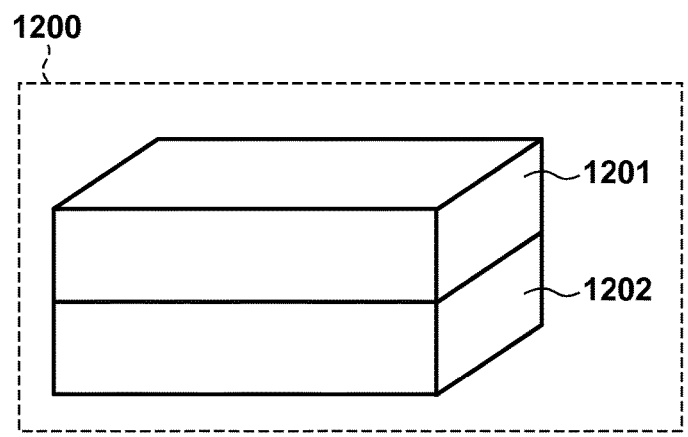
FIG. 12A-FIG. 12B are views for illustrating examples of an image sensor of a stacked structure in accordance with other embodiments.
Figure 12B:
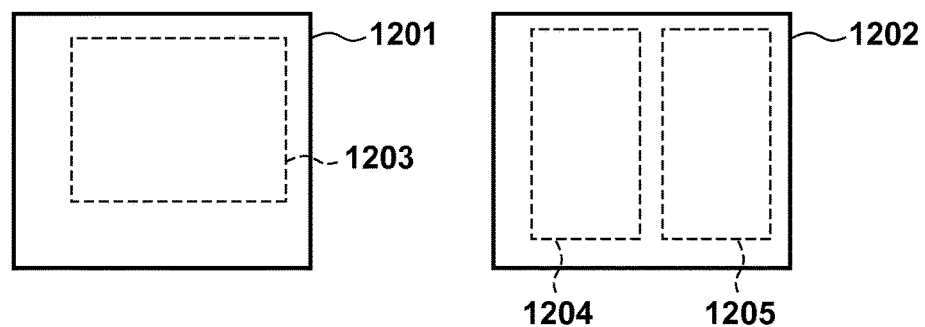

Also, the present invention can be applied to other embodiments shown below. For example, the present invention can be applied to an image sensor 1200 of a stacked structure shown in FIG. 12. As shown in FIG. 12, for the image sensor 1200 of the present embodiment, a first semiconductor chip 1201 and a second semiconductor chip 1202 are stacked at a chip level. FIG. 12A illustrates an oblique projection, and FIG. 12B illustrates a top view of each chip. In a first semiconductor chip 1201, a region including a pixel unit 1203 corresponding to the pixel region 200 of the image capturing unit 102a in the first embodiment, for example, is included, and in a second semiconductor chip 1202 for high speed logic processing portions 1204 and 1205 capable of high speed processing including digital data such as a horizontal scanning circuit and a column A/D conversion circuit corresponding to the A/D conversion unit 102b in the first embodiment, for example, are included. In the configuration of FIG. 1 described above, the image capturing unit 102a included in the image sensor 102, for example, corresponds to the first semiconductor chip 1201. Also, configuration may be taken such that each functional block of the A/D conversion unit 102b, the image data generating unit 102c, the header generation unit 102d, the packet generation unit 102e, and the output unit 102f included in the image sensor 102 is arranged in the second semiconductor chip 1202. Note that the layout of functional blocks for the first semiconductor chip 1201 and the second semiconductor chip is not limited to the configuration described above. Also, the stacked semiconductor chips are not limited to the number of 2, and a configuration may be taken such that 3 or more semiconductor chip are stacked.

Figure 13:
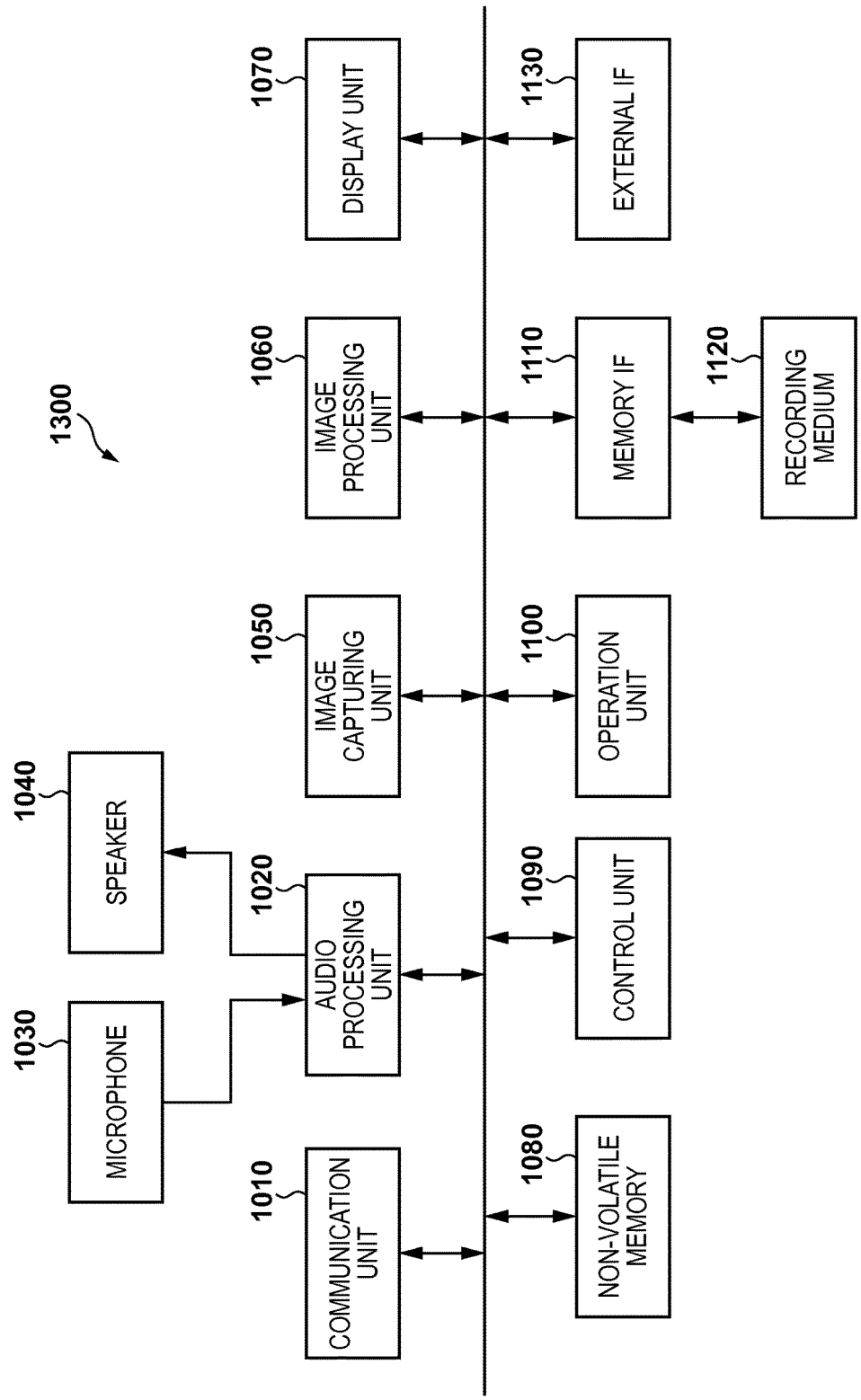
FIG. 13 is a block diagram for showing of a functional configuration example of a mobile telephone, which is an example of an image capturing apparatus in accordance with other embodiments.

Furthermore, it is possible to apply the present invention to a mobile telephone 1300 shown in FIG. 13 as an example of an image capturing apparatus. FIG. 13 is a block diagram for showing a functional configuration of the mobile telephone 1300. The mobile telephone 1300 has an electronic mail function, an Internet connection function, and image capturing and reproduction functions in addition to an audio call function. A communication unit 1010 communicates audio data, image data, or the like, with another telephone device by a communication scheme according to a communication carrier with which a user has made a contract. Upon an audio call, an audio processing unit 1020 converts audio data from a microphone 1030 into a format suited to transmission and sends the result to the communication unit 1010. Also, the audio processing unit 1020 decodes audio data from a call partner sent from the communication unit 1010 and sends the result to a speaker 1040. An image capturing unit 1050 captures an image of an object, and outputs pixel data. The image capturing unit 1050 includes the image sensor 102 described above in the first embodiment, for example. Here, the image sensor 102 may be an image sensor of a stacked structure as described above. Also, the image capturing unit 1050 generate the above described packets and transmits them to an image processing unit 1060. The image processing unit 1060 includes the signal processing unit 103 described above in the first embodiment, and upon capturing of an image, pixel data transmitted from the image capturing unit 1050 is processed, and an image suitable for recording or display is output to each of a display unit 1070 and a memory IF 1110. Also, the image processing unit 1060 processes a reproduced image upon reproduction of a recorded image, and sends the result to the display unit 1070. The display unit 1070 comprises a liquid crystal display panel of several inches, and displays various screens in accordance with instructions from a control unit 1090. A non-volatile memory 1080 stores address book information, electronic mail data, or the like, or data such as image data captured by the image capturing unit 1050.

The control unit 1090 has a CPU, a memory, or the like, and controls each unit of the mobile telephone 1300 in accordance with a control program stored in a memory (not shown). The control unit 1090 includes the control unit 106 described above in embodiments, and controls the image capturing unit 1050 and the image processing unit 1060. An operation unit 1100 comprises various operation keys for the user to input data in addition to a power button, and number keys, and for example, is capable of performing the operation of a live view display. The memory IF 1110 performs a recording reproduction of various data in a recording medium 1120, which may be a memory card, or the like. An external IF 1130 transmit data stored in the non-volatile memory 1080 and the recording medium 1120 to an external device, and also receives data transmitted from an external device. The external IF 1130 performs communication by a wired connection communication scheme such as USB, or a publicly known communication scheme such as one for wireless communication.

Next, explanation is given of an audio call function in the mobile telephone 1300. When a call partner is called, a user instructs a call by inputting a number of a call partner by operating number keys of the operation unit 1100, or selecting a call partner when an address book stored in the non-volatile memory 1080 is displayed on the display unit 1070. When the transmission is instructed, the control unit 1090 transmits to a call partner via the communication unit 1010. Upon an incoming call from a call partner, the communication unit 1010 outputs audio data of a partner to the audio processing unit 1020, and also transmits audio data of a user to the partner.

Also, when transmitting an electronic mail, a user instructs the generation of the mail using the operation unit 1100. When the generation of a mail is instructed, the control unit 1090 displays a screen for generating a mail on the display unit 1070. The user inputs a transmission destination address, a body, or the like, using the operation unit 1100, and instructs transmission. When a mail transmission is instructed, the control unit 1090 sends address information and mail body data to the communication unit 1010. The communication unit 1010 converts data of the mail into a format suitable for communication, and transmits the result to the transmission destination. Also, when the communication unit 1010 receives an electronic mail, the communication unit 1010 converts the received mail data into a format that is suited to display, and displays the result on the display unit 1070.

Next, explanation is given of a capturing function in the mobile telephone 1300. When capturing of a still image or a moving image is instructed, after a user sets an image capturing mode by operating the operation unit 1100, the image capturing unit 1050 captures still image data or moving image data, and sends it to the image processing unit 1060. The image processing unit 1060 processes captured still image data, or moving image data, and stores a result to the non-volatile memory 1080. Also, the image processing unit 1060 sends the captured still image data, moving image data, or the like, to the memory IF 1110. The memory IF 1110 stores the still image, or moving image data in the recording medium 1120.

Also, the mobile telephone 1300 is able to transmit a file including captured still image, moving image data, or the like, as an attachment file of an electronic mail. More specifically, when transmitting an electronic mail, an image file stored in the non-volatile memory 1080 or the recording medium 1120 is selected, and transmission is instructed with it as an attachment file.

Also, the mobile telephone 1300 is able to transmit a file including captured still image or moving image data to an external device such as a PC, another telephone device, or the like, by the external IF 1130. The user instructs transmission by selecting an image file stored in the non-volatile memory 1080 or the recording medium 1120 by operating the operation unit 1100. The control unit 1090 reads out the selected image file from the non-volatile memory 1080 or the recording medium 1120, and controls the external IF 1130 so as to transmit to an external device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-178507, filed Sep. 2, 2014 and 2015-126874, filed Jun. 24, 2015, which are hereby incorporated by reference herein in their entirety.

What is claimed is:

1. An image capturing apparatus, comprising:
an image capturing unit which generates image data of an object;

an information adder which adds recording region information that indicates a region to be recorded and display region information that indicates a region to be displayed to the image data as a header information;
an output unit which outputs the image data to which the recording region information and the display region information is added; and
an image processor which extracts a recording region from the image data which is specified by the cording region information for recording and extracts a display region from the image data which is specified by the display region information for display.

2. The apparatus according to claim 1,
wherein the image processor performs predetermined correction processing on the extracted image data of the recording region or the display region.

3. The apparatus according to claim 2,
wherein the image processor outputs the corrected image data of the recording region to a recording medium or outputs the corrected image data of the display region to a display unit.

4. The apparatus according to claim 1, further comprising
an input unit which inputs an instruction for changing a region with respect to the display region,
wherein the information adder obtains control information based on the instruction for changing the region, and adds the display region information based on the control information.

5. The apparatus according to claim 4,
wherein the input unit inputs a user operation which is an instruction for changing the region with respect to the display region, and
wherein the information adder obtains control information based on the user operation, and adds the display region information based on the control information.

6. The apparatus according to claim 5,
wherein the user operation includes an operation related to a magnified display in a live view.

7. The apparatus according to claim 1,
wherein each of the recording region information and the display region information includes at least one of a start position of a column direction, an end position of a column direction, a start position of a row direction, and an end position of a row direction.

8. An image sensor which provides image data to an image processor, comprising:
an imager which generates image data of an object;
an information adder which adds recording region information that indicates a region to be recorded and display region information that indicates a region to be displayed to the image data as a header information; and
an output unit which outputs the image data to which the recording region information and the display region information are added,
wherein the image processor extracts a recording region from the image data which is specified by the recording region information for recording and extracts a display region from the image data which is specified by the display region information for display.

9. The image sensor according to claim 8,
wherein the information adder obtains control information for obtaining a recording region and a display region, and adds the recording region information and the display region information based on the obtained control information.

10. The image sensor according to claim 8,
wherein each of the recording region information and the display region information includes at least one of a start position of a column direction, an end position of a column direction, a start position of a row direction, and an end position of a row direction.

11. The image sensor according to claim 8, wherein the image sensor is of a stacked structure in which a plurality of semiconductor chips are stacked.

12. A control method of an image capturing apparatus having steps of:
generating image data of an object;
adding recording region information that indicates a region to be recorded and display region information that indicates a region to be displayed to the image data as a header information;
outputting the image data to which the recording region information and the display region information is added; and
extracting a recording region from the image data which is specified by the recording region information for recording and extracting a display region from the image data which is specified by the display region information for display.

* * * * *